US005111129A

United States Patent [19]

Schuman

[11] Patent Number: 5,111,129

[45] Date of Patent: May 5, 1992

[54] WATERPROOF SWITCH AND CHARGING JACK ASSEMBLY

[75] Inventor: Michael L. Schuman, El Monte, Calif.

[73] Assignee: Rainbow Lifegard Products, Inc., El Monte, Calif.

[21] Appl. No.: 520,071

[22] Filed: May 7, 1990

Related U.S. Application Data

[62] Division of Ser. No. 272,078, Nov. 16, 1988, Pat. No. 4,962,559.

[51] Int. Cl.[5] ........ H01M 10/46

[52] U.S. Cl. ........ 320/2; 200/52 R; 439/919

[58] Field of Search ........ 320/2; 439/919; 200/52

[56] References Cited

U.S. PATENT DOCUMENTS 4,456,797 6/1984 Olsen ........ 179/156 R 4,683,587 7/1987 Silverman ........ 381/25

*Primary Examiner*—R. J. Hickey

*Attorney, Agent, or Firm*—Christie, Parker & Hale

[57] ABSTRACT

The invention provides a self-contained cordless electric pool and spa vacuum cleaner which is easily maneuverable over both flat and highly contoured underwater surfaces. A pump impeller, powered by an electric motor, is used to draw water through a compact filter cartridge. The efficiency of the filter cartridge allows for the use of a small motor and small battery which, in turn, result in the small size of the vacuum cleaner. All electrical components are enclosed in a watertight chamber so as to allow the entire cleaner to be submerged under water.

5 Claims, 9 Drawing Sheets

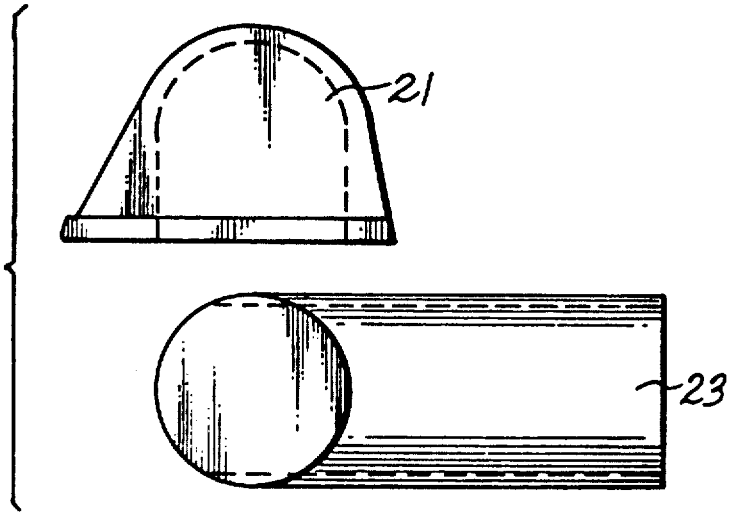
Fig. 3C
Fig. 3D
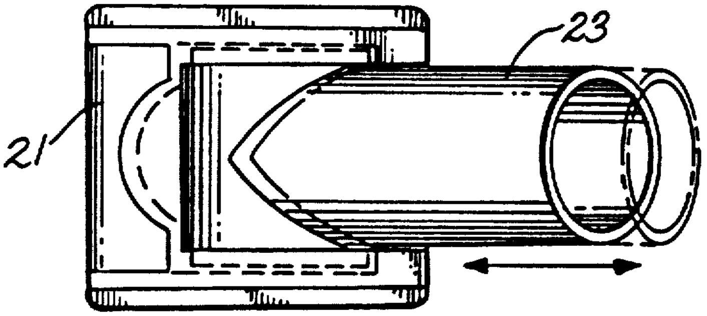

WATERPROOF SWITCH AND CHARGING JACK ASSEMBLY

This is a division of application Ser. No. 07/272,078 filed Nov. 16, 1988, now U.S. Pat. No. 4,962,559 issued Oct. 16, 1990.

FIELD OF THE INVENTION

The present invention relates generally to the field of pool and spa cleaners. Specifically, the invention provides a self-powered submersible vacuum for cleaning the underwater surfaces of pools and spas.

BACKGROUND OF THE INVENTION

Pool cleaners vary widely in degree of sophistication. Existing products range from simple brushes to automatic cleaners with self-propelled vacuum heads. In many designs, the pool's circulation system is used to create the vacuum at the vacuum head in addition to filtering the influent water. In others, the vacuum may be created by applying pressurized water to the device and a filter may be contained on the vacuum head.

The most basic type of pool cleaning device consists of a brush mounted to a pole. This device operates by loosening dirt particles from the pool surfaces, thereby causing them to be suspended in the pool water. These particles are then removed from the water by the pool circulation system. This system can also be used to clean spas which either have their own circulation intake port, of have the capability to "pour over" into the water of an adjacent swimming pool. This cleaning method assumes that after the pool surfaces are brushed, the dirt particles will be removed by the pool circulation system before they settle back down on the pool surfaces.

A more efficient cleaning method provides for a water powered vacuum so that dirt particles will be removed from the pool at the point where they are disturbed by the cleaning device. A water powered vacuum can be powered in either of two ways. One way is to connect the vacuum head to the pump inlet of the pool's circulation system via a suction hose. The second way is by applying a stream of pressurized water to the vacuum head through a suitable hose. With the first method, the water is filtered by the pool's circulation system. Under the second method, a filter located on the device can be used to clean the water before it is returned to the pool, or the device can place dirt particles in suspension in the pool for removal by the filter in the pool circulation system. A water powered vacuum head may be equipped with brush bristles to dislodge dirt particles, or with wheels so that the head can be rolled along the pool surfaces.

A common way to implement this latter class of device is to hinge mount the vacuum head to the end of a pole. The user can then operate and maneuver the vacuum head without getting wet. Existing devices require two connections to be made to the vacuum head, one for the pole, and the other for either the suction hose or the pressurized water hose.

These manual pool cleaners have several drawbacks when used to clean spas. The vacuum heads equipped with wheels are too cumbersome, even when flexible, to efficiently clean smaller and more contoured surfaces. When a vacuum brush head is used, the pole is connected off center of the head toward the user side of the brush. This tends to result in unbalanced brush strokes.

Both the suction type and the eduction type cleaners are inconvenient to use when they must be removed from the pool water. These situations occur when the cleaner must be moved from the pool to a spa. In devices that use the pool circulation system, the prime of the circulation pump must be maintained; movement of the vacuum head to a spa from a pool typically is done by shutting down the pump, disconnecting the hose from the vacuum head, holding one's hand over the exposed end of the suction hose to keep the hose filled with water, and then moving over to the spa where, underwater, either the pool head is reconnected to the hose or a head sized for spas is connected to the hose, after which the pump is restarted. When an eduction-type vacuum head is used, the user runs the risk of being sprayed by the discharge of the pressurized water each time the head is removed from the pool water. Obviously, this can be avoided by turning off the external water supply each time the device is removed from the pool or spa water. However, when cleaning shallow surfaces, the discharge port of an eduction type vacuum head may frequently be inadvertently removed from the water, thus spraying the user.

Automatic pool cleaners move about the under water pool surfaces without the aid of a person. The vacuum effect in the cleaner head may be created by either of the methods previously described. The principle drawbacks to automatic pool cleaners are that they do not effectively clean the highly contoured areas around steps and they cannot be used in small areas such as spas.

SUMMARY OF THE INVENTION

The present invention overcomes many of the limitations of the prior art by providing a compact, electrically powered vacuum cleaner capable of cleaning highly contoured underwater surfaces of pools and spas.

In such a product, and in general terms, this invention provides a cordless electrically powered device which includes a rechargeable battery, and a submersible switch and jack assembly. That assembly comprises a housing having first and second holes in it. A switch is mounted in the housing and has an actuator associated with the first hole. A charger jack is mounted in the housing in alignment with the second hole. A flexible diaphragm is sealed to the housing and is disposed across the first hole. A jack seal member is movably mounted to the exterior of the housing in association with a jack seal load member which is movable on the housing into and out of loading relation to the seal member. The load member urges the seal member into sealing relation to the housing at the second hole when the load member is moved into loading relation to the seal member.

BRIEF DESCRIPTION OF THE DRAWINGS

The foregoing and other features of the invention are more fully set forth in the following detailed description of the presently preferred embodiment of the invention, which description is presented with reference to the accompanying drawings, wherein:

FIG. 3C is a top plan view of the swivel connector;

FIG. 3D is an exploded side view of the swivel connector;

DETAILED DESCRIPTION OF THE INVENTION

Figure 1:
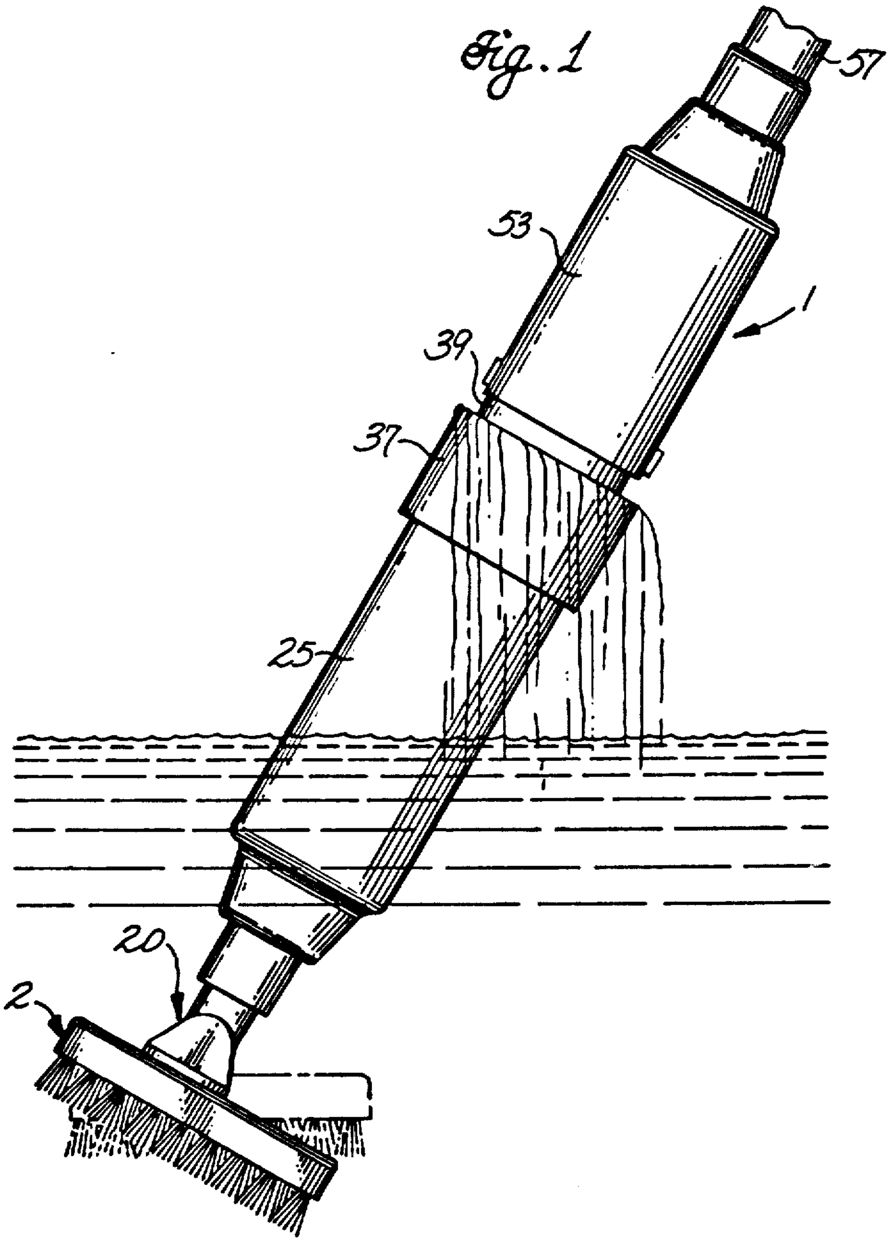
FIG. 1 is an elevation view of the presently preferred cleaner according to the invention.

Referring to FIG. 1, a cordless submersible electric spa and pool vacuum cleaner 1 according to the presently preferred embodiment of the invention is shown in use. A brush head assembly 2, a swivel connection assembly 20, a filter housing 25, a discharge housing 37, and a motor housing 39 are axially aligned components of the cleaner which cooperate to define a water flow path through the cleaner. The motor housing and a battery housing 53, along with other components not shown in this figure, are connected together to form a sealed compartment so that the entire cleaner can be immersed below the surface of water if in a spa, for example, while in operation. An elongate hollow handle 57 extends coaxially from the battery housing to the upper end of the cleaner.

FIG. 2 and FIGS. 3A through 3D show the elements that make up the brush head and swivel connection assemblies. The brush head assembly 2 has an outer circumferential flange 5 and an inner circumferential flange 7 protruding from the underside of an oblong, generally flat, head 3. In the brush head assembly, brush bristle assemblies 9 are mounted about the periphery of the head between the inner and outer circumferential flanges and have bristles which extend away from the head to a selected distance beyond the lip of inner flange 7. The inner flange 7 extends further from the head than does the outer flange 5. The shorter depth of the outer flange allows the brush bristles to splay out as the brush is moved across a surface, and it allows the head to tilt to accommodate brush driving forces applied to the head while still conforming to a surface being cleaned. The edge of each flange is covered by a U-shaped, preferably elastomeric, protective jacket 11 and 13, respectively. These protective jackets not only provide protection to the flanges when the device is used to clean rough cement surfaces, they also provide protection for acrylic or fiberglass spas which have relatively soft, easily-scratched surfaces.

The brush head assembly also features a liquid flow duct 15 which depends into a cavity 12 on the underside of the brush head from around the perimeter of an opening 14 formed through head 3. The cavity is bounded by the underside of the head and by the brush bristles. The open lower end of duct 15 is located at about the same distance below head 3 as the lower edge of inner flange 7. This duct allows the brush head assembly to take the suction created by operation of a pump in the cleaner to a point close to the pool surface engaged by the brush head during use of cleaner 1.

The brush head is detachably connected to the lower end of the principal cleaner assembly via swivel connection assembly 20. This swivel serves both as a mechanical connection of the brush assembly to the remainder of the cleaner and as a liquid flow connection in the cleaner. Swivel assembly 20 is constructed of a T-shaped hollow swivel arm 23 and a socket member 21. The assembly is mounted, in its assembled state, flush to the top side of the brush head over opening 14 by sliding the socket into guide rails 16 on the top of head 3. The socket is held in place by two retention bumps 17 adjacent one end of the rails and by stops 10 at the opposite end of the rails. The swivel arm is then held movably captive in the socket by the cooperation of coaxial stub axles at one end of the arm in semicircular recesses defined in the interior of the socket as shown in FIGS. 3C and 3D. The swivel arm thus is pivotable about the axis of the stub axles, which axis is also parallel to the top of head 3 and transverse to the elongate extent of the oblong head.

The cooperation of the socket with the brush head allows the brush head to be easily disengaged from the swivel. This also allows the cleaner to be connected to other types and sizes of vacuum heads. Further, after the head is removed from the swivel assembly, the swivel can be disassembled for cleaning of grit and other foreign matter which may work its way into the spaces between movable surfaces of the swivel assembly. This is important because silt, grit, and the like can get into the moving surfaces and cause binding or wear. The swivel assembly is arranged so that swivel arm 23 can be moved from being perpendicular to the head to within about 10 degrees of parallel to the top surface of head 3. This movability of the swivel arm relative to the brush head enables the brush assembly to effectively conform to a spa or pool surface being cleaned through a wide range of attitudes of the cleaner handle 57 relative to such a surface, and it also enables the overall cleaner to be stored compactly, as by hanging from a hook in a closet, when not being used.

A resilient, flexible, blade-like seal member 19 is mounted to the brush head adjacent to the side of the swivel arm which can make an acute angle to the brush head. Seal member 19 conforms to the outer contour of the lower portion of the swivel arm throughout the movement of the arm relative to head 3 and so maintains the integrity of the liquid flow passage defined by the socket and the swivel arm from head opening 17 to the upper end of the swivel arm. Seal member 19 is mounted to the top of the brush head between two molded support ribs 18.

Figure 3B:
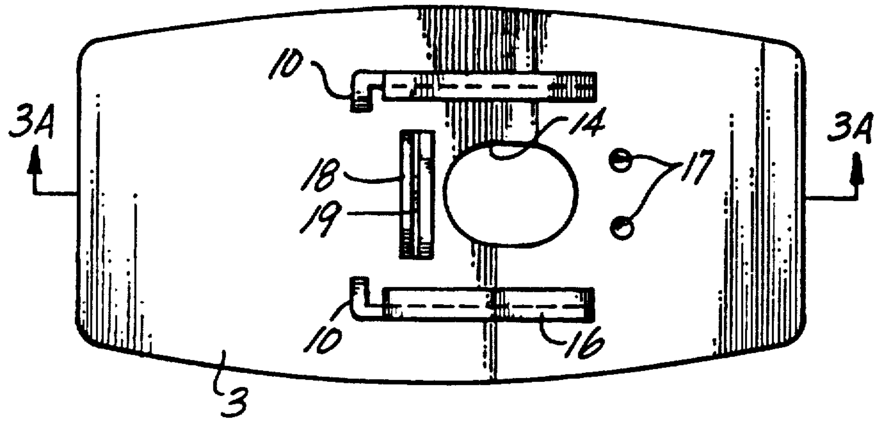
FIG. 3B is a top plan view of the brush head, the view of FIG. 3A being taken along line 3A—3A in FIG. 3B.
Figure 3A:
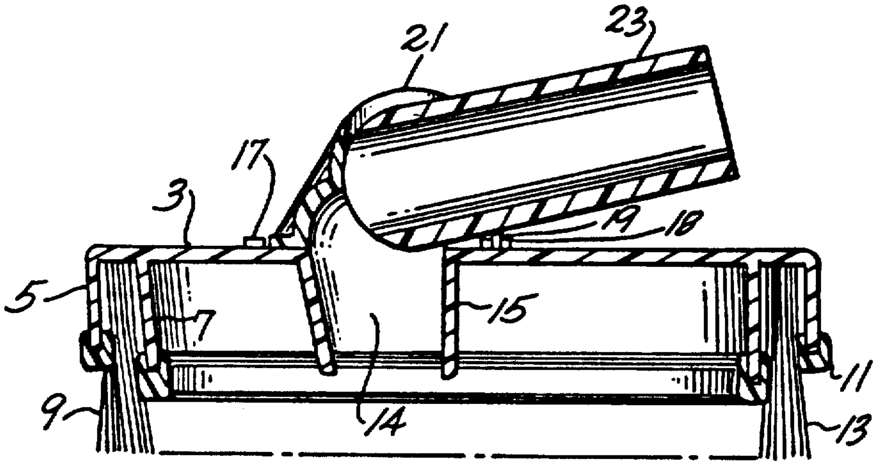
FIG. 3A is an enlarged longitudinal cross-sectional view of its brush head and the swivel connector.

A feature of the arrangement shown in FIG. 3A, e.g., is that the point of connection of the swivel assembly to the brush head is off center from the center of the area of the head toward the forward end of the head along its longitudinal axis. The forward end of the head is defined as that end which is normally disposed away from the user of the cleaner while the cleaner is in use. Such placement of the swivel connection on the brush head counteracts the tendency of the head to tip forward or back as the brush is stroked over a surface and thereby keeps the brush head substantially flush with flat pool and spa surfaces.

The upper end of swivel arm 23 is detachably fitted into the tubular inlet port 22 to the cylindrically shaped filter housing 25 at the lower end of that housing. A flapper-type check valve 27 is used at the inner end of the inlet port to the filter housing to prevent debris in the filter housing from back-flowing out of the cleaner when it is turned off. The check valve is mounted to an annular seat ring 26 which is, in turn, mounted to the inner end of the inlet port within the filter housing.

The end of the filter housing 25 opposite from inlet port 22 is mounted over a collar defined at the lower end of the cylindrical discharge housing 37. The discharge housing is secured by screws (see feature 38 in FIG. 6) coaxially to the lower end of the motor housing 39. An "O" ring 28 is provided around the exterior of the discharge housing's collar. This "O" ring results in a filter chamber 24 within the filter and discharge housings being airtight so that, if the cleaner is used to vacuum a very shallow surface, emergence of the upper end of the filter housing above the water surface will not result in air being drawn into the filter chamber. Introduction of air into the filter chamber can result in the pump losing its prime. The top end of the filter housing is held in place over the discharge housing collar by a pair of spring-loaded detent pins 36. The detent pins are carried in recesses molded into the discharge housing to maintain watertight integrity of that housing. The detent pins are components of detent assemblies which also include springs 35 disposed in the recesses in cooperation with the detent pins to bias the pins into engagement in respective ones of a pair of diametrically opposed holes formed in the upper end of the filter housing above the location where filter housing 25 cooperates with "O" ring 28 in the assembled state of the cleaner. These detent assemblies are removable from the discharge housing in the event they need to be cleaned.

Figure 4:
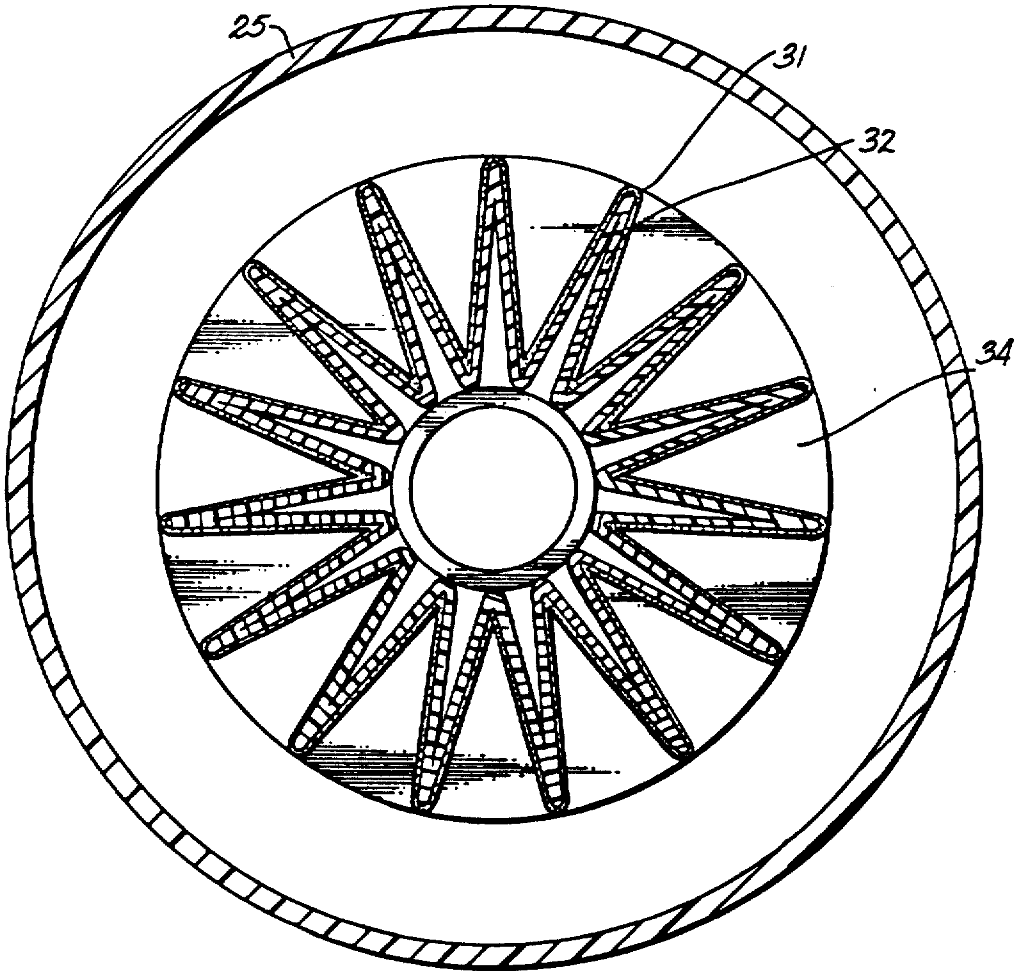
FIG. 4 is an enlarged transverse cross-sectional view of the filter and filter chamber taken along line 4—4 in FIG. 1.

The bottom end of the discharge housing provides an axial annular boss depending into the filter housing and on which filter cartridge 29 is mounted. The filter cartridge includes a sleeve made from pleated filter paper 31 which fitted over a rigid foraminous pleated grid 32 (see FIG. 4) having an overall hollow cylindrical shape. This cylindrical filter is sandwiched between two end plates. One end plate 33, at the bottom end of the filter cartridge, is a solid disk, and the other end plate 34 has a hole in its center to allow water to flow out of the core of the filter into a mounting sleeve 30 which fits over the axial annular boss defined by the discharge housing. The pleated grid keeps the pleats in the filter paper from collapsing as fines accumulate on the filter paper as water flowing radially into the filter cartridge is filtered in use of cleaner 1.

Filter arrangements other than the one shown and described can be used in a cleaner according to this invention. Filter cartridge 29 is preferred, however, because its foraminous grid 32 is important to the provision of a filter which is very compact yet has significant capacity to accumulate solid material in the paper filter medium before the filter develops appreciable resistance to water flow through it and then needs to be cleaned. The grid keeps the pleated paper medium from collapsing as solids accumulate on the outer surface of the filter paper. Thus, the filter, though small, can be used for extended periods before becoming clogged. That means that a small pump and pump motor can be used to provide a cleaner having a surprisingly large filter capacity. The use of a small motor, with low power requirements, means a relatively small battery can be used. All of these factors contribute meaningfully to the provision of a cleaner which is compact and efficient.

Figure 2:
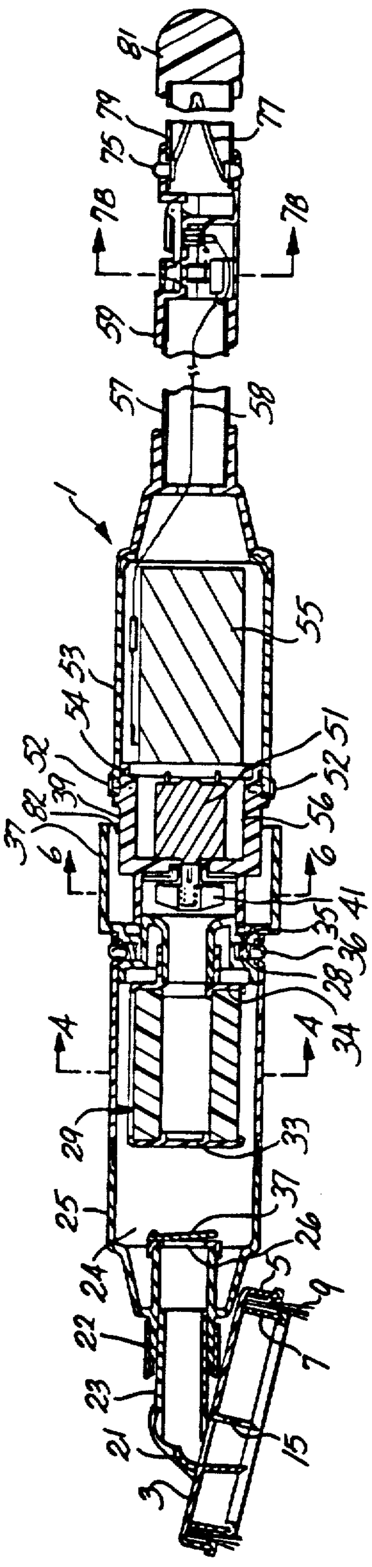
FIG. 2 is a cross-sectional view of the cleaner taken along its longitudinal axis.
Figure 5:
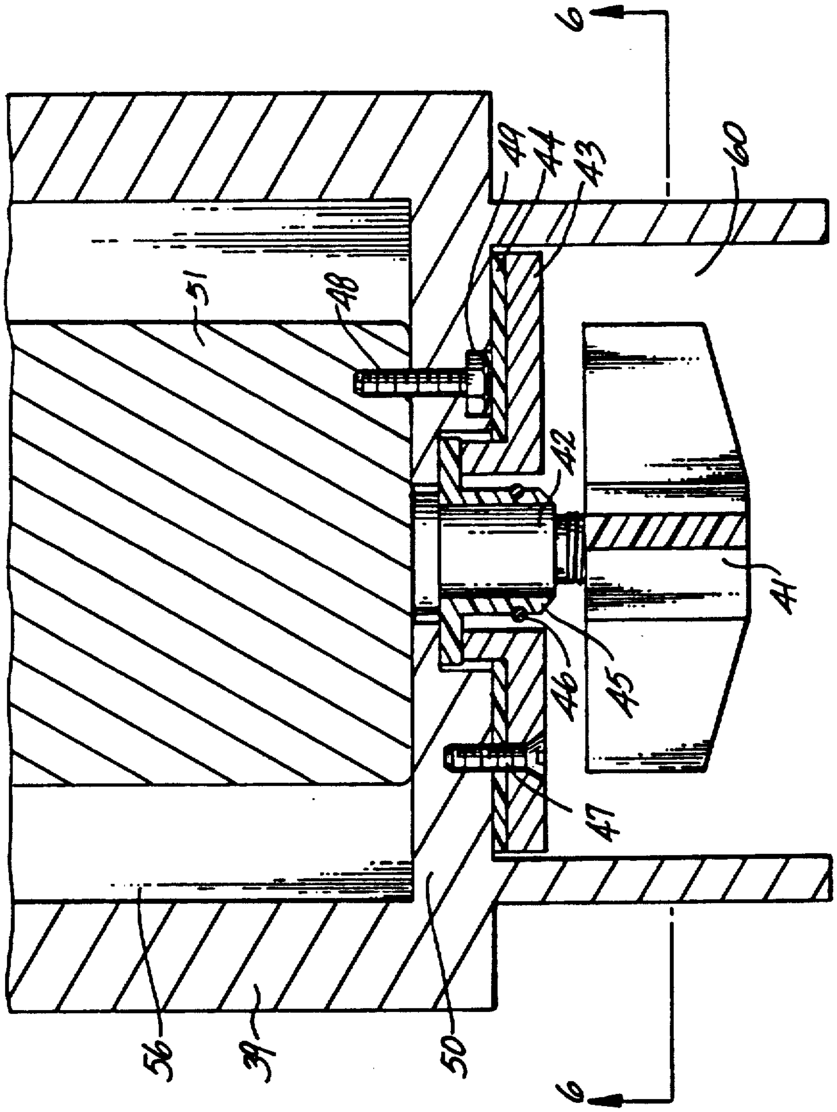
FIG. 5 is an enlarged fragmentary cross-sectional elevation view of the liquid seal separating the motor chamber from the filter chamber.
Figure 6:
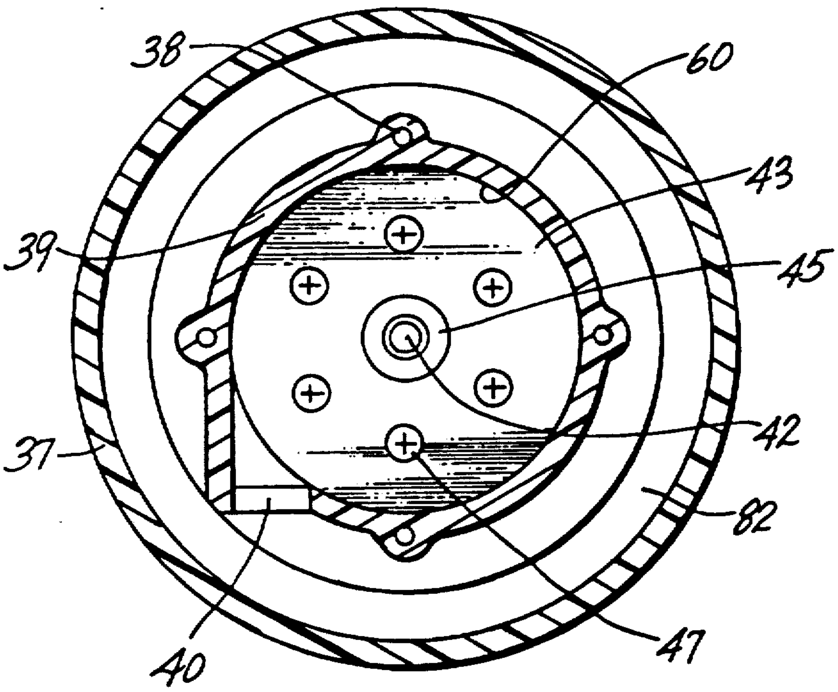
FIG. 6 is a cross-sectional view of the cleaner taken along line 6—6 in FIG. 1 and showing the discharge opening from the cleaner.

The pump impeller 41 is mounted underneath the motor housing 39 opposite the core of the filter at the upper end of the annular axial boss to which the filter cartridge is mounted. FIGS. 5 and 6, as well as FIG. 2, show how the motor housing 39, discharge housing 37 and impeller 41 are related. Referring to FIG. 5, the pump motor 51 is mounted to the upper side of a transverse wall 50 which divides the cylindrical motor housing into an upper motor chamber 56 and a lower annular impeller chamber 60. An axial hole is formed through wall 50. The motor is mounted to the upper side of wall 50 with six screws 48 heads which pass through the wall of the motor housing into the body of the motor. The heads of screws 48 are recessed into the lower surface of wall 50, and there is a gasket 49 between the head of each screw and the recess base. A motor shaft 42 passes through the axial hole in wall 50 of the motor housing into the impeller chamber.

A garter seal 45, which is a molded rubber annular seal, is used as the shaft seal. The garter seal has a coil spring garter 46 around its axial sleeve, through which the motor shaft passes, to assist the sleeve in sealably engaging the motor shaft. In order to assure watertight integrity, a coaxial clamp plate 43 and gasket 44 are mounted to the lower side of motor housing wall 50. The clamp plate has a coaxial annular boss which bears against a peripheral flange at the upper end of the garter seal to force that flange into sealing contact with the motor housing wall circumferentially of the motor shaft. The clamp plate is held in place with six screws 47 recessed in the clamp plate, and passing into the motor housing wall. The impeller 41 is screwed onto the motor shaft via a thread which is defined with regard to the direction of rotation of the motor shaft so the impeller does not unscrew itself off the shaft when the motor is operated. It will be seen that a watertight division is provided in the motor housing between the pump impeller chamber and the motor chamber so that the latter chamber stays dry even though the entire cleaner may be immersed in water intentionally or accidentally.

FIG. 6 shows how the annular water discharge opening 82 from the cleaner is defined between the motor housing 39 and discharge housing 37. This figure shows the end of the motor shaft 42 without the impeller attached. Water reaches the annular discharge opening from impeller chamber 60 area via a hole 40 located adjacent to the impeller in the side wall of the impeller chamber. The inner diameter of the upper end of discharge housing is greater than the outer diameter of that portion of the motor housing which is surrounded by the upper end portion of the discharge housing. The area of the annulus so formed, measured in a plane normal to the axis of the cleaner, is several times greater than the area of the inlet port to the filter chamber. Thus, as the cleaner is operated, filtered water is discharged gently over the upper end of the discharge housing to gently flow back into the pool or spa being cleaned, as shown in FIG. 1. This gentle return of water to the spa or pool avoids disturbance of sediments on uncleaned surfaces of the spa or pool. The gentle discharge velocity also assures that the discharged water cannot spray a user of the cleaner in the event the discharge opening lies above the water surface at any time during use of the cleaner.

The bottom of the motor housing is mounted to the discharge housing via four screws that pass through the discharge housing into receiving holes 38 formed in the bottom portion of the motor housing.

Referring back to FIG. 2, the lower end of cylindrical battery housing 53 is engaged about the upper end of motor housing 39 and is connected to the motor housing by two screws 52 which pass through the battery housing into the motor housing at diametrically opposed locations on the cleaner. The upper outer end of the motor housing carries an "O" ring 54 over which the battery housing fits snugly to assure a watertight seal in this connection. A battery 55, preferably a rechargeable battery, is mounted in the battery housing, and is electrically connected to the motor via suitable wires 58 and a motor control switch 61.

An elongate hollow handle 57 extends upwardly along the axis of the cleaner from the upper end of the battery housing and has its interior open to that of the battery housing. The interiors of the handle and the battery housing comprise part of the motor chamber 56. The connecting surfaces between the battery housing and the handle, and between a switch and jack housing 84 and the handle are contiguous in order to maintain a watertight seal.

Figure 7C:
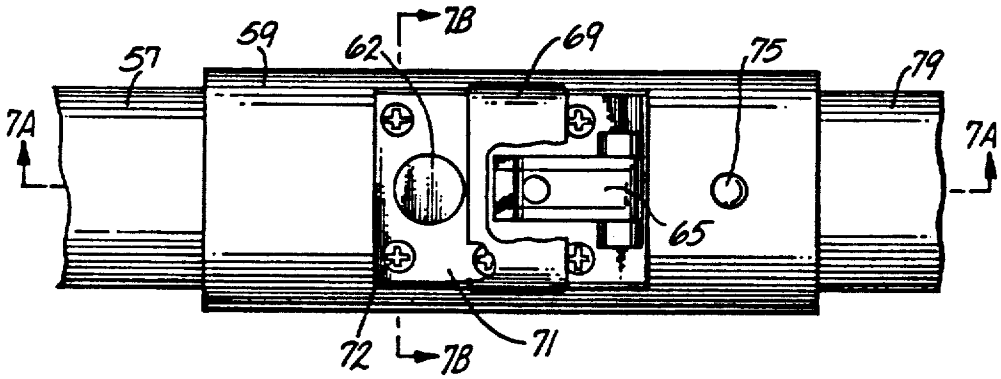
FIG. 7C is a top plan view of the control switch and charging jack assembly, FIG. 7A being a view taken along line 7A—7A in FIG. 7C.
Figure 7A:
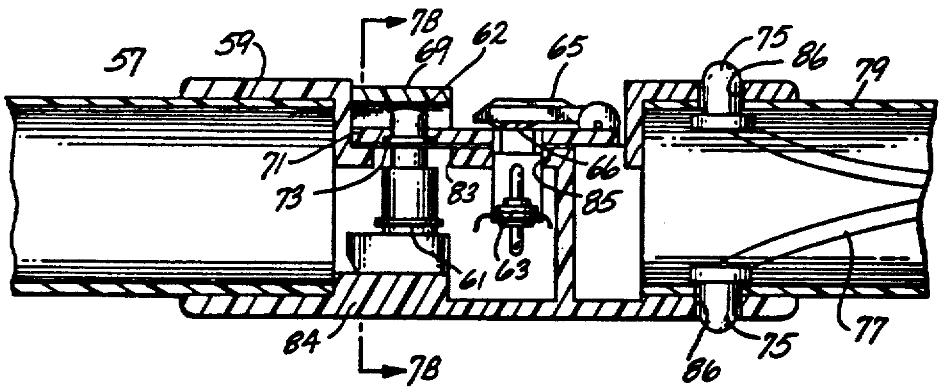
FIG. 7A is an enlarged cross-sectional elevation view of the control switch and charging jack assembly located in the handle of the cleaner shown in FIG. 1.
Figure 7B:
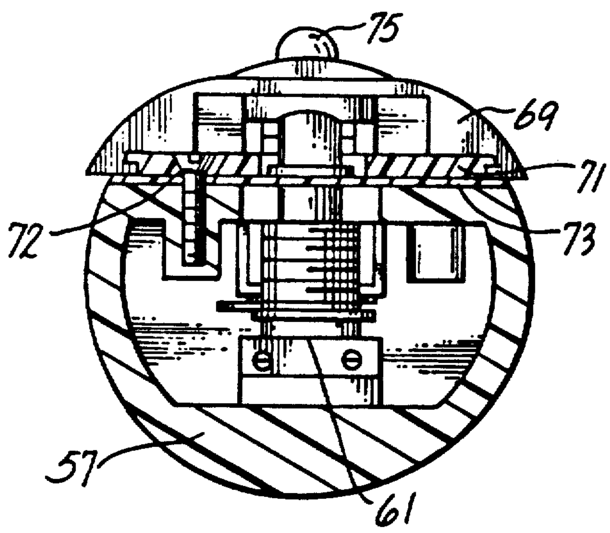
FIG. 7B is a cross-sectional view of the control switch and charging jack assembly taken along line 7B—7B in FIG. 1.

Details of a switch and jack assembly 59 are shown in FIGS. 7A, 7B and 7C. The switch and jack assembly is designed so that it can be immersed in the pool if desired, particularly when a handle extender 79 is engaged with the upper end of the switch and jack assembly 59. An on/off motor control switch 61 is of the "push on/push off" type so that a user of the cleaner need not keep his hand on the on/off switch to operate the pump. Therefore, a five foot or longer tubular handle extender can be connected to the upper end of the cleaner handle. The on/off switch is located within the dry interior of the handle, and has a push button actuator disposed in a hole 83 formed through a housing 84 for assembly 59. The switch actuator is located behind a rubber diaphragm 73 which is disposed across hole 83 and is sealed to the housing 84. The diaphragm carries on its outer surface a button 62 which is engaged by a user to operate the on/off switch. Switch 61 is connected in a circuit with the motor and the battery via wiring bundle 58.

Immediately above the motor control switch in switch and jack assembly 59 is a recharger jack 63. It will be recalled that battery 55 preferably is a rechargeable battery, and so cleaner includes jack 63 in circuit with the battery for use in recharging the battery via a suitable charging device when the cleaner is not in use. The recharger jack cannot be buried behind a waterproof diaphragm, as is switch 61, because the jack must be accessible to receive a cooperating component of the separate charging device (not shown). Jack 63 is located in housing 84 in association with a second hole 85 through the housing; hole 84 is located closely adjacent hole 83, preferably just above the latter hole. Hole 85 normally is covered by the free end of a spring-loaded jack seal carrier finger 65 which is pivoted to the exterior of housing 84 toward the upper end of the housing. The finger is movable to provide access to jack 63 in hole 85, but is biased by its spring (not shown) into overlying relation to the hole. The underside of finger 65 carries a rubber button seal 66 which cooperates with the hole to the jack to provide a watertight seal to the jack. During use of the cleaner, finger 65 and seal 66 are forcibly moved toward jack access hole 85 by camming cooperation of the top of the finger with the underside of a slide member 69 which is disposed across and above the outside of housing 84. Slide member 69 is slidably captive to the housing and is movable between a position over actuator button 62 for motor control switch 61 and a separate position in which the slide cams against the top of the finger when the finger is disposed in its usual position over jack access hole 85. In its latter position the slide member urges the jack seal 66 into sealing relation with hole 85. In this way, the slide member serves as a jack seal load member.

In order to use the cleaner, the user must move slide member 69 upwardly over the top of the jack seal carrier finger to expose on/off switch button 62. When the slide member is so moved, it cooperates with the spring-loaded finger as described above to establish a watertight seal around the jack access opening.

Rubber diaphragm 73 is held to the switch and jack assembly housing with a rigid cover plate 71 and six screws 72 which are recessed into the plate, the screws passing through the diaphragm and into the housing.

It will be seen that motor control switch 61 cannot be operated unless slide member 69 is disposed to seal the jack access opening. Thus, when the cleaner is in use, the motor chamber is closed in a watertight manner and the cleaner can be fully submerged without harm to the electrical components of the cleaner.

The upper end of switch and jack housing 84 is tubular and provides diametrically opposed holes 86 for receiving two detent pins 75. Detent pins 75 are features of an integral molded plastic retainer carried inside a lower end of a tubular handle extender 79 for cleaner 1; the pins are disposed in respective holes through the extender and biased into such positions by respective spring arms 77 of the retainer which preferably is a product of Rainbow Plastics of El Monte, Calif. Cap 81 is placed over the upper end of the extender pole for the safety of the user of the cleaner.

The present invention has been described above with reference to the presently preferred cleaner according to the invention. Workers skilled in the art to which this invention most closely pertains will readily appreciate that the invention can be embodied in cleaners having features and structural organizations different from those described while still practicing and not departing from the teachings and advances made by the invention. For example, while less preferred, other forms of filters can be used, as can different forms of vacuum heads. Other forms of electric power, rather than a rechargeable battery can be used, such as suitable low voltage power supplied from a suitable transformer to the cleaner via a power cord hardwired in a watertight manner to a suitable motor in the cleaner. Similarly, such workers will recognize that certain of the arrangements described can be used to advantage apart from a cleaner of the character shown and described, such as the eccentric connection of an operating pole to a pool or spa cleaning vacuum head or brush at a location forward of the center of area of such a device, rather than at or rearwardly of its center. Therefore, the foregoing descriptions are not an exhaustive catalog of all forms in which this invention can be embodied within the fair scope of the invention; the following claims are to be read and applied in that light.

What is claimed is:

1. In a cordless electrically powered device which includes a rechargeable battery, a submersible switch and jack assembly comprising:

a housing defining therethrough a first hole and a second hole;

a switch mounted in the housing and having an actuator associated with the first hole;

a charger jack mounted in the housing in alignment with the second hole;

a flexible diaphragm sealed to the housing and disposed across the first hole;

a jack seal member movably mounted to the exterior of the housing; and a jack seal loader member movable on the exterior of the housing into and out of loading relation to the jack seal member and urging the seal member into sealing relation with the second hole when in said loading relation.

2. Apparatus according to claim 1 wherein the holes are defined proximate each other in the housing, and the jack seal load member is mounted to the housing and is so configured that, when the load member is in said loading relation to the jack seal member, the switch is accessible for the diaphragm and that, when the load member is out of said loading relation, it renders the switch inaccessible and renders the jack seal movable away from the second hole for access to the charger jack.

3. Apparatus according to claim 2 including a movable seal carrier carrying the jack seal member thereon, the seal carrier being movable toward and away from a position in which the seal member covers the second hole, a spring coupled to the seal carrier biasing the carrier into said position, the establishment of said loading relation being dependent upon the seal carrier being in said position, and the load member when in said loading relation forcibly engaging the seal carrier to urge the seal member into sealing relation with the second hole.

4. Apparatus according to claim 3 wherein the jack seal load member is slidably mounted to the housing for movement between said loading relation to the jack seal member and a position overlying the first hole.

5. Apparatus according to claim 4 wherein the seal carrier comprises a finger pivoted to the housing at one end thereof and carrying the jack seal member adjacent an opposite end thereof on an underside thereof, and the load member being forcibly engageable with an upper side of the finger when the finger is disposed to place the jack seal member over the second hole.

* * * * *